United States Patent
Kobayashi

(10) Patent No.: US 7,210,897 B2
(45) Date of Patent: May 1, 2007

(54) ACTIVELY-CONTROLLED SOUND ABSORPTION PANEL SYSTEM USING MOVEMENT-CONTROLLED REFLECTIVE PLATE

(75) Inventor: Hiroshi Kobayashi, Tokyo (JP)

(73) Assignee: National Aerospace Laboratory of Japan, Chofu-shi (JP)

( * ) Notice: Subject to any disclaimer, the term of this patent is extended or adjusted under 35 U.S.C. 154(b) by 1358 days.

(21) Appl. No.: 09/987,907

(22) Filed: Nov. 16, 2001

(65) Prior Publication Data

US 2002/0061110 A1 May 23, 2002

(30) Foreign Application Priority Data

Nov. 20, 2000 (JP) .................................... 2000-352910

(51) Int. Cl.
*F01D 25/00* (2006.01)

(52) U.S. Cl. ..................... 415/118; 415/119; 415/126
(58) Field of Classification Search ............... 415/118, 415/119, 126
See application file for complete search history.

(56) References Cited

U.S. PATENT DOCUMENTS 5,415,522 A * 5/1995 Pla et al. .................. 415/118

5,979,593 A * 11/1999 Rice et al. ................. 181/207

FOREIGN PATENT DOCUMENTS

| EP | WO9611465 | 4/1996 |
|---|---|---|
| EP | WO9612269 | 4/1996 |
| JP | 10-97261 | 4/1998 |

\* cited by examiner

*Primary Examiner*—Ninh H. Nguyen
(74) *Attorney, Agent, or Firm*—Westerman, Hattori, Daniels & Adrian, LLP

(57) ABSTRACT

A space 4 constituted by a sound absorption panel section 1 and active sound absorption control system section 2 between the inner and outer walls of a nacelle forming an engine intake/exhaust duct is utilized as an acoustic resonance field and as a sound absorption field by sticking a porous sound absorption material 14 onto the inside wall surface of the space. The panel section 1 defines a sound absorption space by means of surface plate 6 made of a perforated plate and wire mesh materials plate, panel construction side plate 9 and back sheet plate 13 having porous sound absorption material stuck thereon; and a movement-controlled reflective plate 8, that is capable of movement/rotation control with respect to said perforated plate, is provided within this sound absorption space. Movement of the reflective plate 8 is controlled utilizing the adaptive feed forward control method by means of the output from an active sound absorption control system section 2.

10 Claims, 6 Drawing Sheets

Fig. 4-A
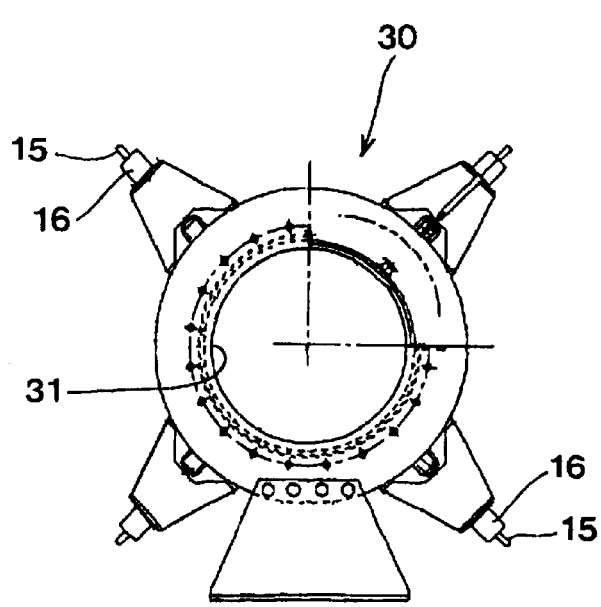
Fig. 4-B
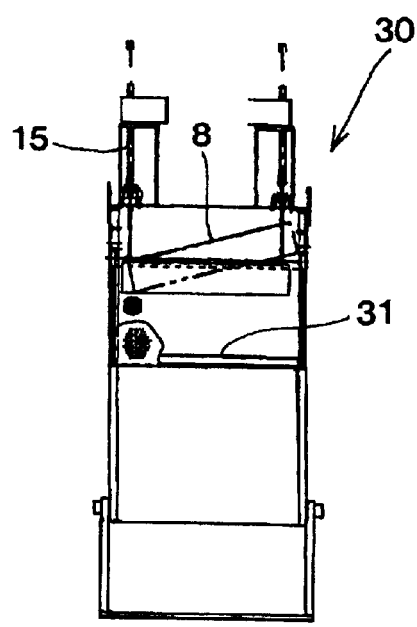
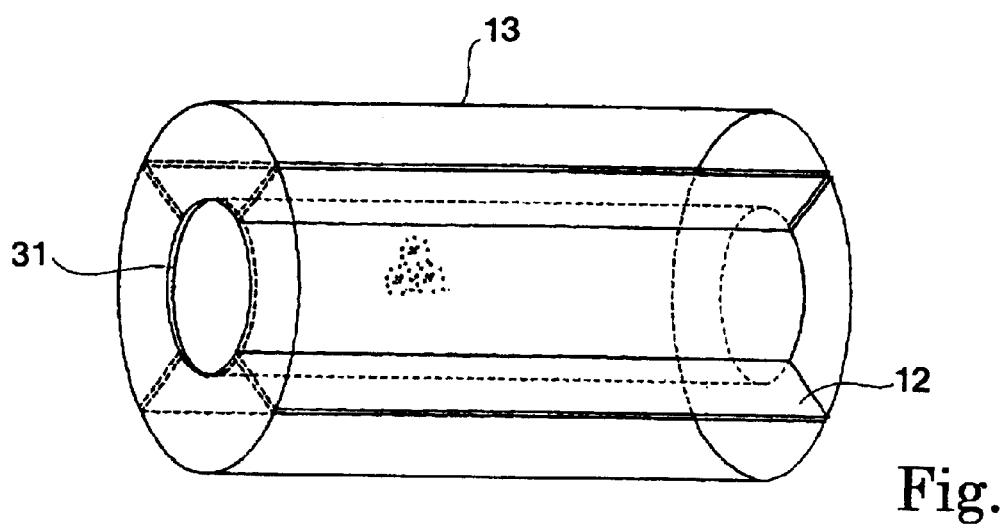
Fig. 5

Fig. 7-A
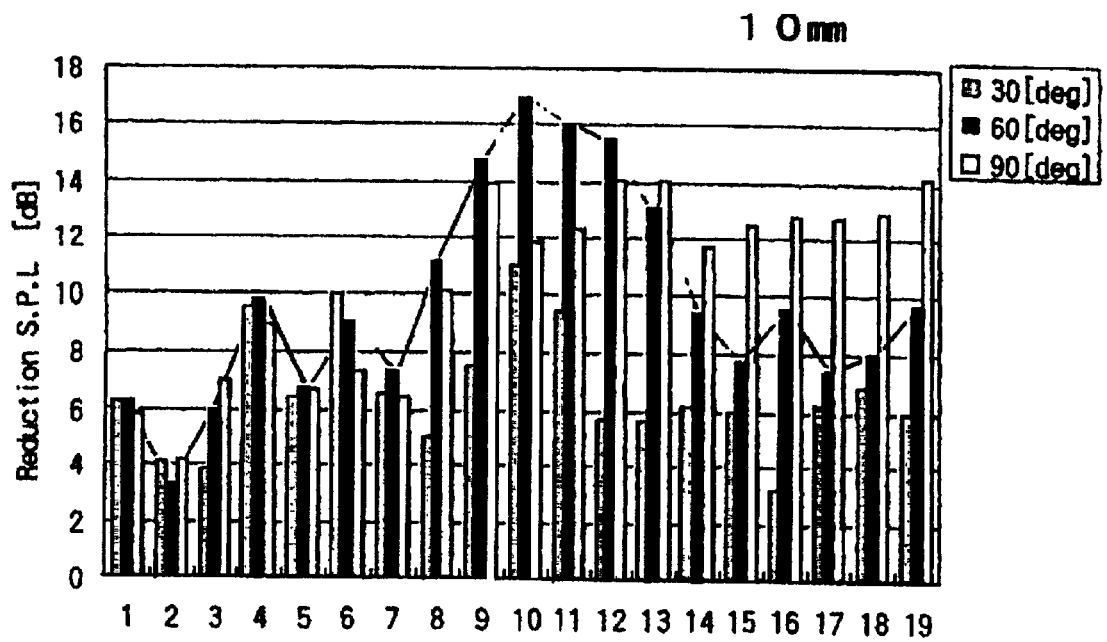
Fig. 7-B
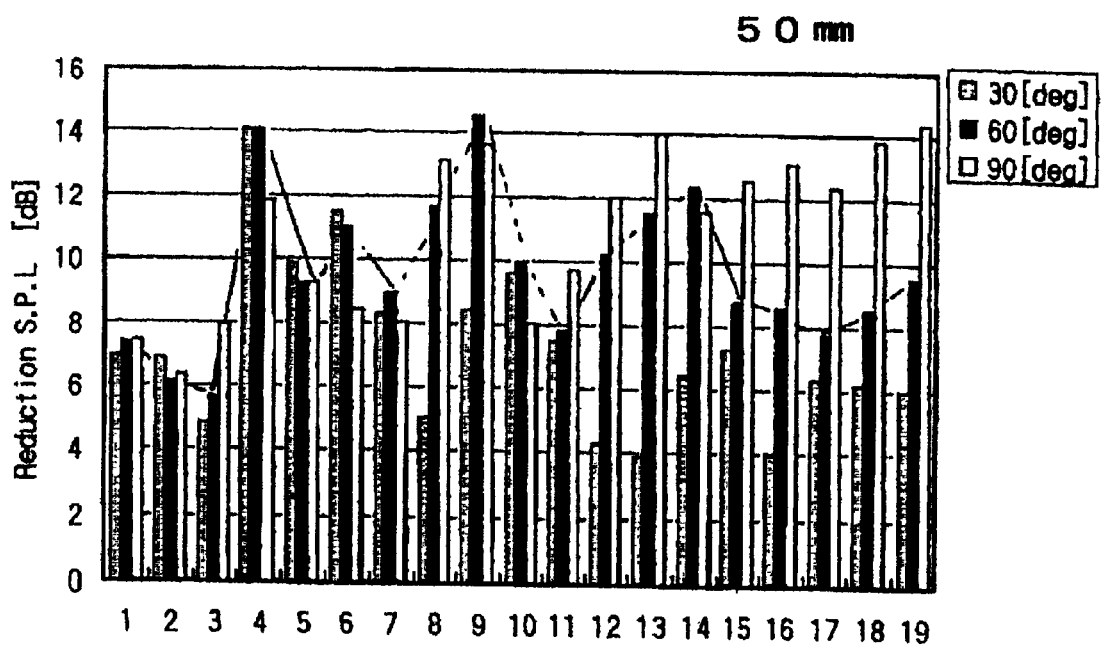

ACTIVELY-CONTROLLED SOUND ABSORPTION PANEL SYSTEM USING MOVEMENT-CONTROLLED REFLECTIVE PLATE

BACKGROUND OF THE INVENTION

1. Field of the Invention

The present invention relates to an actively-controlled sound absorption panel system using movement-controlled reflective plate and in particular to an actively-controlled sound absorption panel system using movement-controlled reflective plate capable of use as an acoustically lined duct for noise reduction of aircraft engines, gas turbines for power generation and emergency use, turbo machinery and blowers etc, for noise reduction in ducts of blowers or air-conditioners etc or tunnels, and for noise reduction of roads, factories, works or residences where there are severe variations of noise source character, namely sound level and spectrum.

2. Description of the Related Art

Problems of environmental availability regarding aircraft noise in particular engine noise represent serious problems that must be solved for operation of current aircrafts and for development and entry into service of new types of aircraft such as second-generation supersonic aircraft or high subsonic aircraft of ultra high bypass ratio turbofan engine. Therefore, considerable research and development aimed at aircraft noise reduction is continuing up to the present. As such noise reduction techniques, various types of acoustic panel are known in which acoustic absorption materials or acoustic panel structures are used as acoustic liner typically in the intake and exhaust ducts of engines; however, in recent years, active noise control techniques have attracted attention, in which noise is cancelled or reduced actively in response to changes of noise source character, namely noise level and spectrum.

In a currently proposed active noise control technique for aircraft engines, for example a plurality of microphones and acoustic transducers are arranged upstream and downstream of the fan rotor and fan outlet guide vane stage of the jet engine, and a control output signal is supplied from a fan reference signal and an error signal detected by the acoustic transducers and microphones, and the signal actuates an air control valve installed in fan stages, so as to provide acoustic cancellation of fan tone noise by delivering a high-pressure air into tone generation devices (ref. WO 96/12269).

However, these prior art of fan noise reduction techniques are unsatisfactory on account of the following problems.

(1) Regarding acoustic absorption materials or acoustic panel structures, although absorption spectrum has been somewhat widened and peak values have also been increased by use of various types of sound absorption material and special design of the sound absorbent structure, the reduced spectrum peak values are still insufficient. In addition, the absorptive peak frequency of the panels is practically fixed, and therefore the panels have the drawback that they are not able to cope with changes of noise source character, namely spectrum and peak frequency demanded for engine noise reduction (the B.P.F. tone frequency on landing and on take-off changes by 30 to 40%.)

Also (2) as a turbofan engine noise reduction technique, various types of acoustical panels are used as acoustic liners of engine ducts, but, due to restrictions on the honeycomb depth of these panels, they are practically incapable of sound absorption in respect of sounds of lower frequency.

Furthermore, (3) regarding the change of acoustical absorption character of the panel in response with engine noise source changes, although an acoustical panel can achieve a noise reduction amount of about 8 dB at a tuned fan rotational speed, at other rotational speeds the amount of noise reduction is reduced by about half, so that high-level noise reduction cannot be achieved, corresponding to engine operation changes.

Also, since the conventional active noise control techniques was restricted to one noise component reduction of the fan noise spectrum, even if all these were reduced, a noise reduction of only some 1 to 2 dB was obtained by the techniques in terms of the noise evaluation unit used in the aircraft noise certification (evaluation in terms of O.A.S-PLdB (A), which is a unit based on the noise unit of the aircraft noise restriction value). Also, they have the drawback that an active control system aimed at reducing various acoustic modes of fan blade passing frequency tone and harmonics becomes complicated and expensive. Also, due to the limitation of acoustic output power level of the cancellation noise sound, intensive fan tones of 150 to 160 dB cannot be reduced by only active noise control system. A further problem is the failure of fan noise reduction due to occurrences of mis-tuning of the active cancellation of fan noise and of response lag of the active system. Furthermore, in the case of conventional active sound absorption panel techniques, the absorptive spectrum peak level and the peak frequency shift of the active sound absorption panel were small, so that the conventional active sound absorption panel technique could not be adapted in response to changes of fan rotational speed. Also, there were problems such as that the sound absorption level of low frequency sound below 800 Hz was extremely small and the absorptive frequency range was narrow, and the absorptive spectral level was small.

SUMMARY OF THE INVENTION

In view of the aforementioned problems of the prior art, an object of the present invention is to provide an actively-controlled sound absorption panel system using movement-controlled reflective plate whereby the following technical problems can be met.

Specifically, a main object of the present invention is to avoid the occurrence of noise reduction failure due to acoustic cancellation mis-tuning and non-operation of the control system and/or response lag of the active control system. A further object is to make it possible to reduce easily and inexpensively, by simple active control system, fan noise of high intensive sound level (noise level of SPL 150 dB to 160 d). Yet a further object is to make it possible to reduce fan noise to the required level by only one noise reduction devices. Also, a further object is to make possible high-level absorption of low-frequency sound, particularly required in ultra high bypass ratio turbofan engine noise reduction. Furthermore, another object is to make it possible to efficiently and economically absorb intensive sound with a spectrum of a wide range from low-frequency sound to higher harmonics of fan blade passing frequency tone, in order to shorten and reduce the weight of the acoustically lined duct. Further, another object is to make it possible to flexibly exert active control, corresponding to noise spectrum peak value change and peak frequency shift of engine noise source (for example a frequency shift of the order of 30% to 40%) so as to obtain high-level sound absorption in the wide frequency range in order to flexibly cope with changes in the aircraft engine.

Aiming at solving the aforementioned problems, in the course of various studies, the present inventors discovered that noise of a wide frequency range could be absorbed by forming a sound absorption space of adaptive size in a sound absorption panel wherein the inside wall face of the panel is constituted by a perforated plate and/or multi-layered metallic wire mesh sound absorption material, and actively producing changes in the mode and position of a movement-controlled reflective plate within said sound absorption space in response to the noise source character changes and thereby arrived at the present invention.

Specifically, an actively-controlled sound absorption panel system using a movement-controlled reflective plate according to the present invention that solves the aforementioned problems comprises: a sound absorption panel section in which a sound absorption space is formed by a surface plate made of a perforated plate, side plates with porous material stuck thereon, and a back sheet plate with porous material stuck thereon, and a movement-controlled reflective plate is provided in said sound absorption space such that said movement-controlled reflective plate is slightly smaller than said perforated plate, having a porous material stuck onto the inside surface of the reflective plate, and is capable of actively-controlled movement and rotation with respect to the perforated plate; and an active sound absorption control system section having a sensing sensor and an error sensor arranged either upstream and downstream of said sound absorption panel section, a signal processor performing the difference of the overall sound pressure levels measured by said two sensors and driving control motors producing the mode and position of the reflective plate in order to obtain maximum difference of the overall sound pressure level detected by the two sensors. Wherein provision is made such that large fan noise reduction in a wide frequency range from lower frequency sound to higher harmonics of blade passing frequency tone can be actively achieved in an optimal fashion of the mode and position of the movement-controlled reflective plate in response to change of noise source character.

By arranging said movement-controlled reflective plate to be capable of drive control so as to make possible arbitrary composite movement including three-dimensional positional displacement such as parallel displacement, forwards/rearwards tilting, side tilting and rotation with respect to the direction of propagation of the sound, and three-dimensional movement such as curved movement, rotation and rocking, large reduction of fan noise over a wider frequency range can be achieved. Preferably the whole of said sound absorption panel sections forms an acoustical lined duct or sector of arbitrary shaped cross section such as circular, rectangular or elliptical, and a plurality of sound absorption panel sections are arranged by partitioning the lined duct or sector in either the circumferential direction and the axial direction. Each panel sector can have the three-dimensional displacement drive control of said movement-controlled reflective plate for increasing noise reduction.

If the system is employed for noise reduction of an aircraft engine, by forming said sound absorption space in the space between the inner and outer walls of the nacelle constituting the intake/exhaust duct of the engine, engine noise in a wide frequency range from low-frequency sound to higher harmonics of fan BPF tone can be reduced under conditions of high intensive sound. Preferably said panel surface plate comprises a perforated plate, and multi-layer metallic wire mesh or multi-layer porous material stuck onto the inside of said perforated plate. Furthermore, by forming the structural members of the panel section by a strong and heat-resistant sound absorption material for high temperature and high pressure use, they may be appropriately applied to engine inlet and exhaust lined duct and acoustic liner of turbine noise, and acoustically lined ejector of jet noise. For said movement-controlled reflective plate, an optimum shape may be selected depending on the device to which the shape is to be applied and it may be formed of any desired shape such as flat plate, semi-elliptical, semi-cylindrical, hemispherical, or corrugated shape, or a shape obtained by superimposition of these.

The said signal processor is arranged to perform processing by a least mean square algorithm such that the difference of the overall sound pressure levels detected by the sensing sensor arranged immediately in front of the fan and by the error sensor arranged upstream of the panel is a maximum and to output a motor drive control signal relating to mode/position of the reflective plate. By in advance compiling and storing information regarding the sound absorption performance of the sound absorption panel section, in the mode and positional displacement of the reflective plate, the time for processing the least mean squares method algorithm can be shortened, enabling the response of active control to be improved. It should be noted that, for the drive means of the three-dimensional movement/rotation of the reflective plate a motor drive mechanism, hydraulic/air-pressurized drive mechanism or wire and wheel drive mechanism may be adopted, though there is no particular restriction to these.

BRIEF DESCRIPTION OF THE DRAWINGS

FIG. 4—A is a side view of a test model of circular duct liner device for verifying the present invention and FIG. 4—B is a front view thereof;

FIG. 5 is a diagrammatic perspective view of test model of acoustically lined circular duct composed of 4 actively-controlled sound absorption panel systems shown in FIG. 4—A and FIG. 4—B;

FIG. 7—A shows changes of the noise spectrum reduced by the test model device in respect of positional changes of the movement-controlled reflective plate in parallel mode, in the case where the reflective plate is in a 10 mm parallel position, and FIG. 7—B shows the condition when it is in a 50 mm parallel position from the perforated plate.

DESCRIPTION OF THE PREFERRED EMBODIMENTS

An embodiment of the present invention is described in detail below with reference to the drawings.

Figure 1:
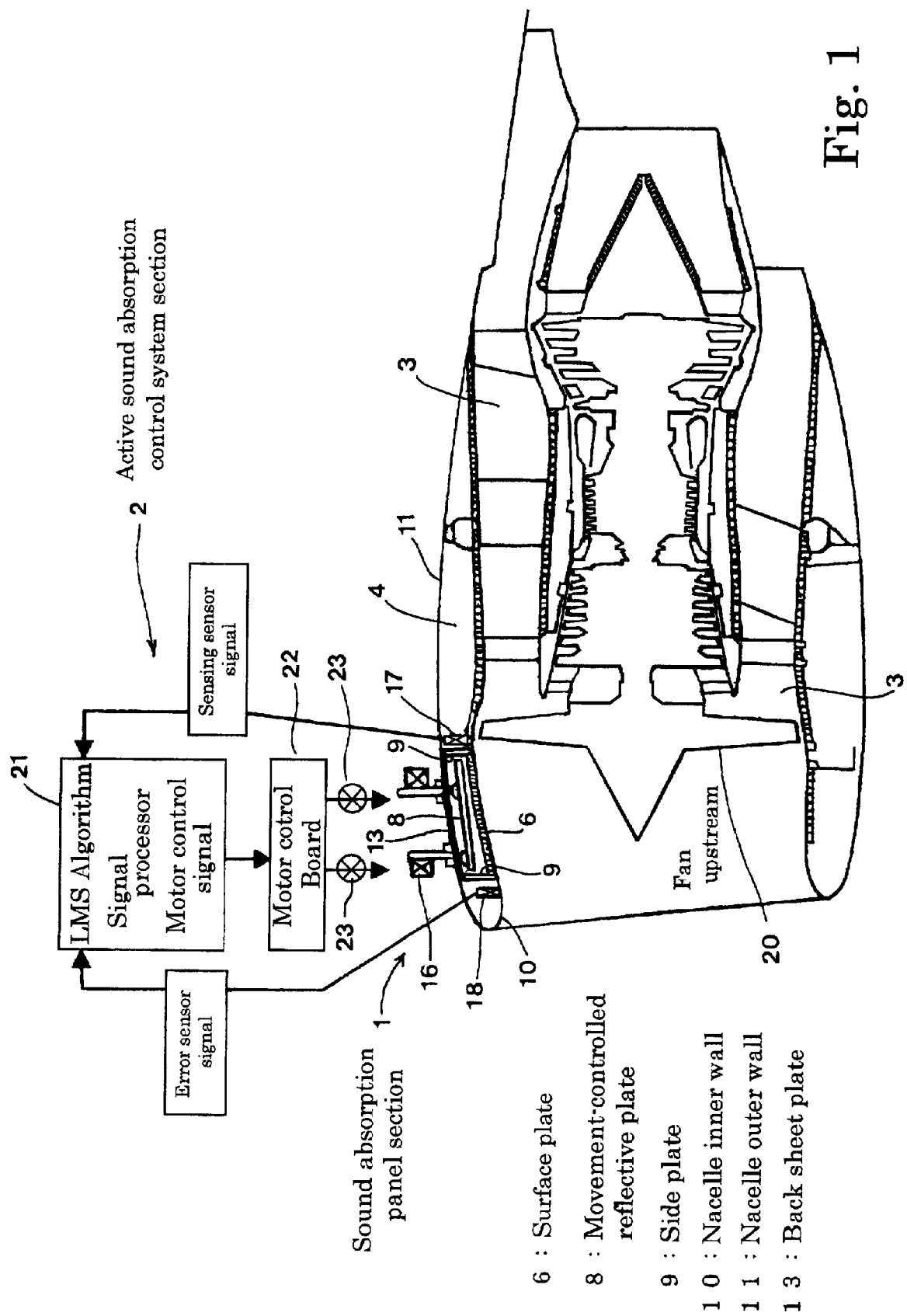
FIG. 1 is a diagram of the case where an actively-controlled sound absorption panel system using a movement-controlled reflective plate according to an embodiment of the present invention is applied to a jet engine.
Figure 2:
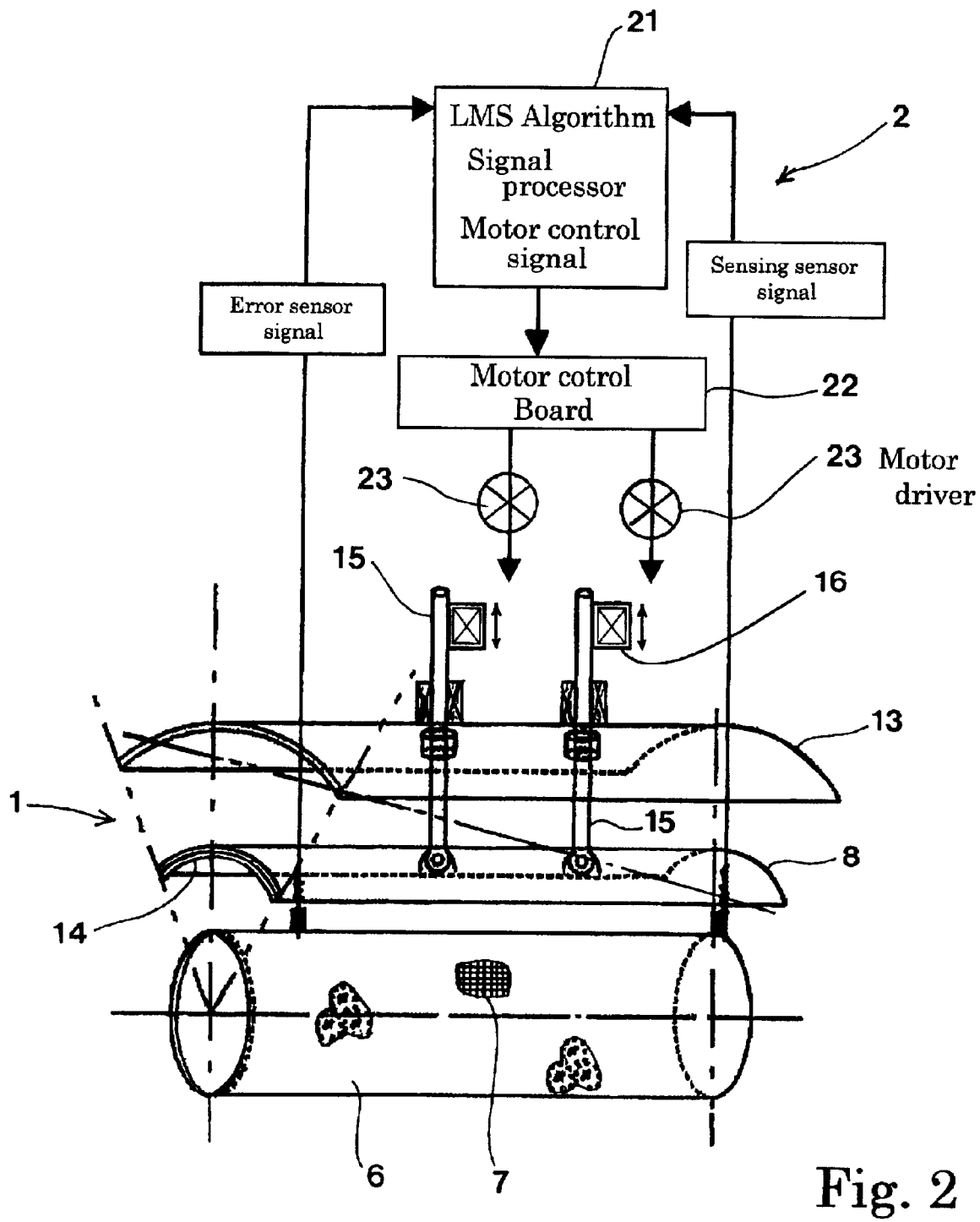
FIG. 2 is an exploded view of major parts thereof.
Figure 3:
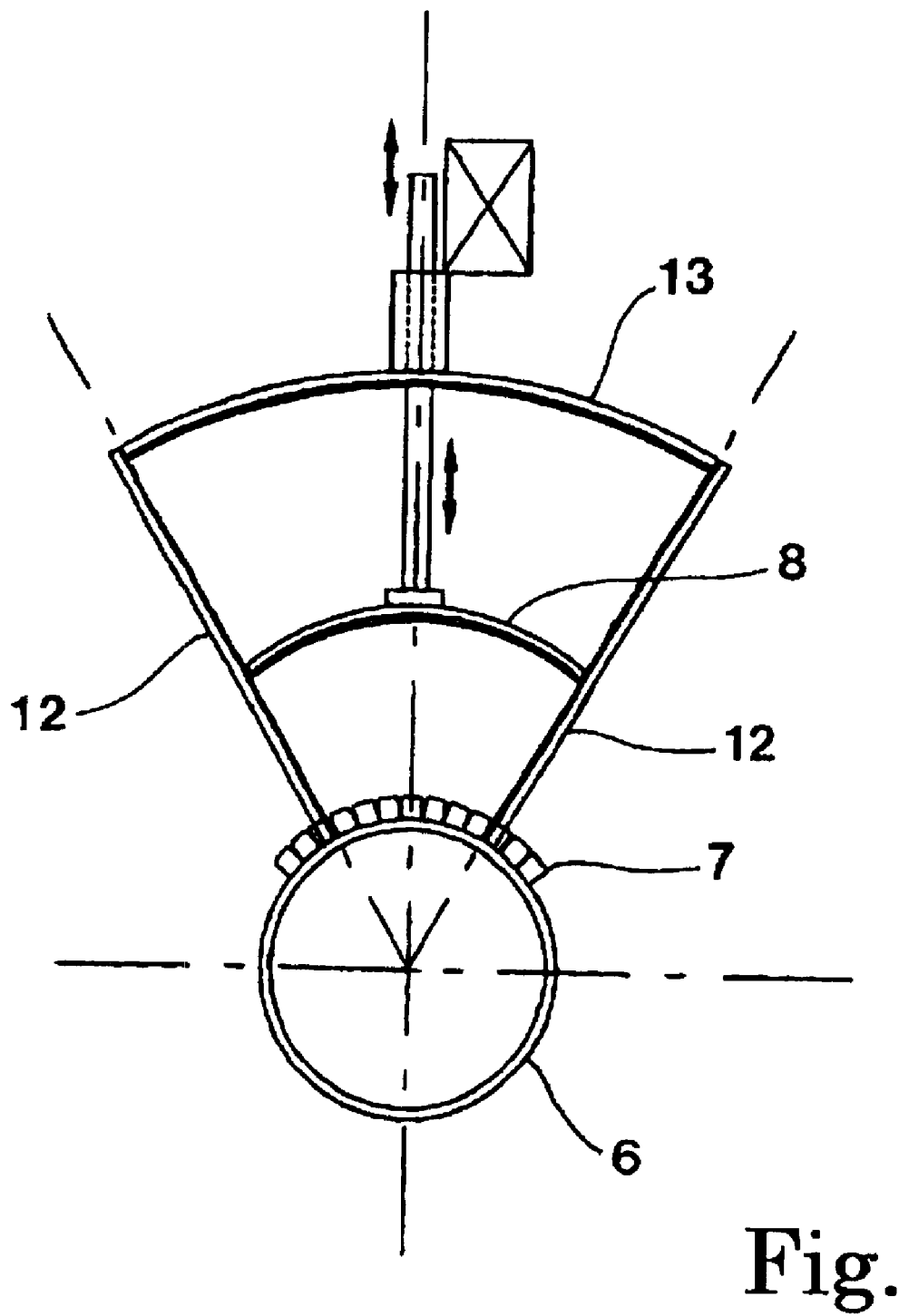
FIG. 3 is a side view of major parts thereof.

FIG. 1 and FIG. 2 show an embodiment in which an active panel system according to the present invention is applied to engine fan noise reduction of an aircraft. The fan inlet duct liner of this embodiment is constituted by a sound absorption panel section 1 and an active sound absorption control system section 2. In the sound absorption panel section 1, in order to absorb engine noise in a wide frequency range from low frequency noise to higher harmonics of fan BPF tone under high intensive sound conditions, the space 4 between the nacelle inner wall 10 and nacelle outer wall 11 is used as an acoustic resonance field and as a sound absorption field by sticking porous sound absorptive material onto the inner wall and surface of the space.

Figure 6:
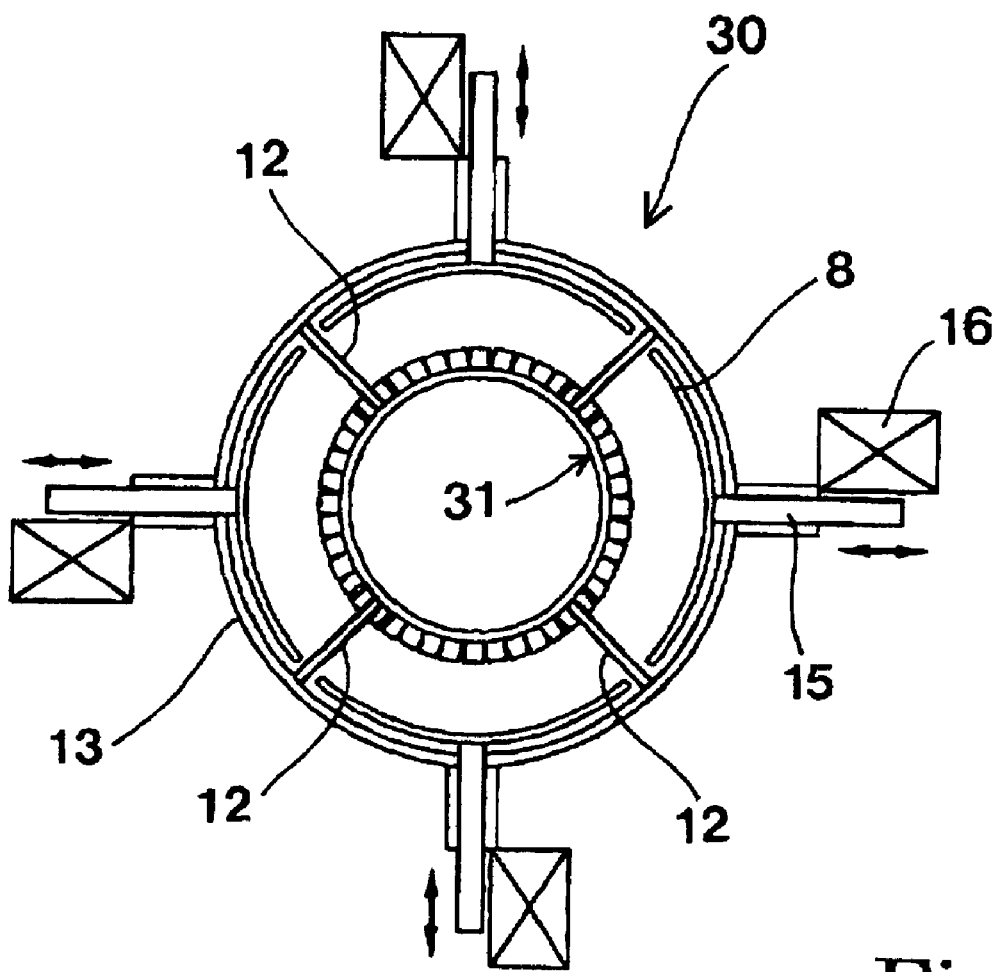
FIG. 6 is a side view illustrating the operating condition thereof.

Specifically, space 4 formed by a shaped curved surface having the radius of curvature of nacelle inner wall 10 and nacelle outer wall 11 of the engine intake/exhaust duct 3 is partitioned as shown diagrammatically in the test model liner of FIG. 5 and FIG. 6 by means of a partition 12 into a plurality of spaces (four in the illustrated embodiment) in the circumferential direction, and surface plate 6 is thereby formed by a perforated plate facing the noise field (the nacelle inner wall 10 is constituted by a perforated plate), side plate 9, and back sheet plate 13 (part of the nacelle outer wall 11 in this embodiment). Thus, a movement-controlled reflection plate 8 is arranged such as to be capable of three-dimensional positional displacement such as parallel, forwards/rearwards tilting, and side tilting etc with respect to the direction of sound propagation, and of composite movement constituted by three-dimensional movement such as curved, rotary and rocking with respect to said surface plate 6 within this space 4, constituted by said reflective plate 8, surface plate 6, side plate 9 and back sheet plate 13.

Thus, using the panel section 1 constituted by laminating a multiple of metallic wire mesh 7 or honeycomb material on the inside of the perforated plate and by sticking porous sound absorptive material 5 on the side plate 9, partition 12 and back sheet plate 13, an intensification of sound absorption over a wide frequency range of noise is aimed at.

In addition, active sound absorption control system section 2 alters the sound absorptive character of the panel so as to obtain optimum sound absorption, by actively changing the mode of movement-controlled reflective plate 8 (parallel, forwardly/rearwardly tilted, side tilted etc) and the position (separation) relative to the perforated plate in response to change of engine noise source. Simultaneously, the reflective plate 8 is made slightly smaller than the perforated plate dimensions in order to intensify the noise reduction by guiding low-frequency sounds into the acoustic lined panel space. Consequently, since porous noise absorption material 14 is also stuck on to the inside surface of the reflective plate as described above, it acts as a sound absorbing plate.

There are no particular restrictions on the mechanism for performing three-dimensional displacement such as parallel displacement, forwards/rearwards tilting, or side tilting or three-dimensional movement such as curved movement, rotation or rocking of movement-controlled reflective plate 8 and any desired mechanism such as a motor mechanism, hydraulic pressure, and air pressure drive mechanism or wire wheel drive mechanism may be adopted. In this embodiment, as shown in FIG. 2, the movement-controlled reflective plate 8 is pivotally linked to the bottom ends of two drive rods 15 with a prescribed separation in the axial direction, and the top ends of these drive rods are supported so as to be movable in the axial direction with a linear movement mechanism 16 driven by a control motor (pulse motor) arranged on a fixed part, passing through back sheet plate 13. Consequently, in this embodiment, by linear movement of drive rods 15 with the same stroke by the two linear movement mechanisms, the movement-controlled reflective plate is moved parallel relative to the surface plate 6 so that it can be positioned in parallel at arbitrary position in the panel space, and by altering the strokes of the two drive rods 15, the reflective plate 8 can be tilted forwards or rearwards so that it can be held in a leading end raised or leading end lowered position with respect to the direction of sound propagation. It should be noted that, although not shown in the drawing, by providing the drive rods with a separation in the forwards/rearwards direction (direction of sound propagation) on the reflective plate 8 and by providing them with a separation in the width direction, the plate can be held tilted in the width direction also: thus, parallel, forwards/rearwards tilted, and side tilted three-dimensional positional displacement can be achieved. Thus, by controlling the motors driving linear drive mechanisms by control signals to be described, so that the control amounts are individually altered continuously in response to changes of noise source character, composite movement constituted by three-dimensional movement such as curved movement (tilting in the forwards/rearwards direction), rotation (tilting in the width direction) and rocking of the reflective plate can be performed in an active fashion.

In the active control system section 2 of this embodiment in which the reflective plate 8 is actively controlled in response to changes of the aircraft engine noise source, a sensing sensor 17 and an error sensor 18 of an acoustic transducer and/or a microphone are provided, installed on either side of the sound absorption panel section 1, immediately in front of fan 20 and upstream thereof, in order to optimize sound absorption by detecting control errors. The fan noise is detected by these sensors and the output signals of both sensors are subjected to processing by the LMS (least mean square method) algorithm by a signal processor 21 constituted by a computer which performs processing in order to obtain the maximum value of the total sound pressure O.A.SPL difference measured by the error and sensing sensor and outputs a control signal to drive the control motors of the linear movement mechanisms for the reflective plate drive in accordance therewith.

By actuation control of the control motors through motor control board 22 and motor driver 23, the linear movement mechanism 15 controls movement and rotation of movement-controlled reflective plate 8 in response to changes in engine operation, such that actively-controlled acoustic lined duct can achieve to absorb engine noise in a wide frequency range. The control of movement-controlled reflective plate 8 is movement control utilizing the adaptive feed forward control method. In this way, optimum sound absorption adapted to changes in the noise source of fan 20 (of spectrum or acoustic mode etc) is provided.

With the actively-controlled sound absorption panel system of this embodiment, thanks to its construction as described above, in which the back sheet plate of a conventional noise absorbing panel is removed and replaced by a small movement-controlled reflective plate, the engine nacelle space being utilized as a sound resonance and absorption field, large absorption of low-frequency sounds is achieved. The low frequency noise absorption can be increased by Helmholtz mechanism whereof this space is the volume and the entire aperture opening area is the throat and by the resonance mechanism generated between the side plates in the axial direction and circumferential direction of the noise absorbing panel. In addition, there is sound absorption due to resonance with the many standing waves of low frequency produced in the panel space by the presence of the movement-controlled reflective plate. Due to these mechanism, this sound absorptive panel system can perform large absorption of lower frequency noise.

Also, by changes in the distance and/or mode of tilting between a surface plate 6 and the reflective plate 8, the distance between the two plates is changed in the duct radial direction, and the resonance frequency is shifted into the frequency of the ¼ wavelength sound coincident with the distance of two plates, at which there is large sound absorption. Due to the reflective plate moving effect on the resonance frequency shift, the frequency range becomes wider in the case of tilted mode than in the case of parallel mode. In the first tilted mode in which the leading end of the reflective plate 8 is raised in the sound propagation direction and in the second tilted mode in which the leading end of movement-controlled reflective plate 8 is raised in the sound source direction, the noise reflected by movement-controlled reflective plate 8 and produced by mutual interference with duct-propagating noise at different angles from ones of the parallel mode, so the amounts of reduced fan noise spectrum and spectral peak values are different from amount in the parallel mode case.

Furthermore, in order to promote the active control speed and noise reduction performance with the rapid movement/mode of reflective plate 8, a data bank in relation to noise absorbing information of the panel is compiled and stored in the active control processor, in advance, using the reflective plate movement/mode and displacement amount as parameters, and this data bank is employed when performing LMS algorithm processing in order to improve stability of the active sound absorption control system and speed of selection/determination of control signals thereof. Control of movement/mode of the reflective plate in order to obtain an optimum acoustical absorption spectrum can therefore be achieved in a rapid and stable fashion, in response to changes of the engine noise source.

[Practical Examples]

In order to verify the action and effect of the actively-controlled sound absorption panel system using a movement-controlled reflective plate according to the present invention, a test model device of annular duct liner as shown in FIG. 4 to FIG. 6 was constructed and the following tests were conducted.

Since the basic construction of this test model device 30 is this same as that of the embodiment shown in FIG. 2, equivalent members are given the same reference symbols as in the embodiment and further detailed description thereof is omitted. In this test model device 30, a sound absorption panel section was constructed by sticking a carbon fiber mat of thickness 20 mm on the inside of reflective plate 8, and by superimposing one perforated plate with two aluminum wire meshes. However, the structural member surface of the panel space of test model was not acoustically lined to be acoustic rigid wall. The following series of basic tests were carried out. It should be noted that driving control setting motors manually, instead of using the active control system performed movement of the reflective plate.

Regarding the mode and positional displacement of the reflective plate, the parallel condition is that the movement of the reflective plate is conducted in holding the plate in a parallel mode with respect to the perforated plate, and the first tilted mode and second tilted mode are that one end of the reflective plate is lifted, fixing the other end of the reflective plate on the perforated plate, in the sound propagation direction and in the noise source direction, either. In the noise absorption test, a noise input duct with two or three speaker driver unites was connected to the test model duct and square wave noise, white noise, or noise obtained and recorded in a YJ—69 engine noise measurement (with a microphone at a circumference of radius 3 m from the center) was injected as noise source from the noise input duct.

In various mode/position conditions of the movement-controlled reflective plate of the test model duct, noise measurements were conducted using microphone placed at positions of 30°, 60° and 90° (where the 0° position is on the center line of the duct) on a circumference of radius 1 m from the center of the duct outlet, of the same height as the test duct, and the noise absorption spectrum distribution and O.A.SPL dB (A). Also, having aluminum tape stuck on the perforated plate, hard wall duct noise test was conducted. The noise absorption effect was obtained from the differences of the spectra between the lined duct and the hard wall duct.

As an example of various test result, FIG. 7 shows the reduced noise spectrum measured at microphone positions of 30°, 60° and 90° with respect to two different position of the reflective plate in the parallel mode, in the case where white noise was injected; (a) shows the case where the position of the reflective plate was at 10 mm distance from the perforated plate and (b) shows the case where it was at 50 mm. 1 to 19 on the transverse axis in this Figure are reference numbers of 1/3 Oct. analysis corresponding to respective frequencies; these respective numbers represent, in order, 0.25, 0.315, 0.4, 0.5, 0.63, 0.8, 1, 1.25, 1.6, 2, 2.5, 3.15, 4, 5, 6.3, 8, 10, 12.5 and 16 kHz.

As can be seen from this FIG. 7, by the positional displacement of the movement-controlled reflective plate at a microphone position of 60°, the sound absorption peak frequency was shifted from 2 kHz of (10) in the case of 10 mm, to 1.6 kHz of (9) and 0.5 kHz of (4) in the case of 50 mm. This shows that a noise of a required frequency range can be absorbed by changing the position of the reflective plate. Also, regarding the amount of the shift, better results were obtained in tilted mode. It should be noted that, although in the present test device, no sound adsorbing material was stuck onto the inside wall surface of the panel space, it may be predicted that the sound adsorbing effect would be further increased by sticking the porous sound absorbent material on as in the embodiment.

From a series of basic test results obtained using white noise, it was found that an actively-controlled sound adsorption panel system using a movement-controlled reflective plate in accordance with the present invention can achieve sound reduction of the high level of 10 dB O.A.SPL dB (A) and a shift of sound absorption peak frequency (from 40% to 50%) over a wide frequency range. Also, the other test using the recorded YJ-69 engine noise as noise source show that when the injected YJ-69 engine noise changes from the engine idle operating condition to the engine maximum operating condition, noise absorption of high level more than 8.0 O.A. SPL dB(A) could be achieved over all engine operating range, by the actively-controlled sound absorption panel system using a movement-controlled reflective plate according to the present invention, even in respect of injected sound having various types of noise spectrum. These test results confirmed that the system of the present invention could conduct optimum sound absorption of fan noise and turbine noise, by the changes of mode/position of the reflective plate.

Although an actively-controlled sound absorption panel system using a movement-controlled reflective plate according to the present invention was described above, the present invention is not restricted to the embodiment described above and various design modifications are possible within the scope of its technical concept. Also, the location of arrangement of the sound absorption panel system in the aircraft engine is not restricted to the position described above and it could for example be arranged in any desired location of inlet and exhaust ducts of the nacelle or in any desired location of the core engine. In this case, the sensing sensor is installed on the noise source side and the error sensor is installed on the downstream side of the panel. Also, the panel system using a movement-controlled reflective plate is not restricted to application to aircraft engines but could also be applied to inlet and exhaust ducts of for example gas turbines for electricity generation and emergency use, turbo machines or blowers, and air-conditioners. By forming the active panel system for wall panel use, the panel system can be applied to reduce noise at road sides where noise of severely fluctuating level is generated, in factories and in works or residences area.

As described above, with the actively-controlled sound absorption panel system using a movement-controlled reflective plate according to the present invention, optimum sound absorption can be achieved, since absorption character of the panel can be changed arbitrary to obtain appropriate acoustical absorption spectrum peak values and peak frequency value shifts (for example frequency shifts of the order of 30% to 40%) and high-level sound absorption of noise spectra of wide frequency range can be obtained, flexibly responding to changes of engine operation etc.

Since the noise reduction mechanism of the active panel system is based on the sound absorption in this way, occurrence of the failure situation of noise reduction due to acoustic cancellation mis-tuning and non-operation of the control system caused by severe transitional changes of the engine and/or response lag of the active system can be avoided. Also, engine fan noise of high intensity can be easily and inexpensively reduced by this single active panel system. In particular, reduction of low-frequency fan noise produced in fan engines of very high bypass ratio can be achieved.

What is claimed is:

1. An actively-controlled sound absorption panel system using a movement-controlled reflective plate comprising:

a sound absorption panel section in which a sound absorption space is formed by a surface plate made of a perforated plate, side plates with porous sound absorption material stuck thereon, and a back sheet plate with porous sound absorption material stuck thereon, and a movement-controlled reflective plate is provided in said sound absorption space such that said movement-controlled reflective plate is slightly smaller than said perforated plate, having a porous sound absorption material stuck onto the inside wall face thereof, and is capable of controlling movement and rotation with respect to said perforated plate; and an active sound absorption control system section having a sensing sensor and an error sensor arranged facing the noise field on either side of said sound absorption panel section, a signal processor that performs processing such that the difference of the overall sound pressure levels measured by said two sensors is a maximum and that outputs a control signal relating to the mode and position of said reflective plate, and a movement-controlled reflective plate drive control motor driven by the control signal from this signal processor;

wherein provision is made such that noise in a wide frequency range can be actively absorbed in an optimal fashion, by controlling the mode and position of said movement-controlled reflective plate in response to change of the noise source character.

2. The actively-controlled sound absorption panel system according to claim 1, wherein said movement-controlled reflective plate is arranged to be capable of drive control so as to make possible composite movement including three-dimensional positional displacement such as parallel displacement, forwards/rearwards tilting, side tilting and rotation, and three-dimensional movement such as curved movement, rotation and rocking.

3. The actively-controlled sound absorption panel system according to claim 2, wherein the whole of said panel sound absorption section is formed by a duct or sector of arbitrary shaped cross section such as circular, rectangular or elliptical, a plurality of active sound absorption panel sections are arranged by partitioning said duct or sector into a plurality of active control panel sections, and provision is made such that three-dimensional displacement drive control of said movement-controlled reflective plate can be achieved at each actively-controlled panel section.

4. The actively-controlled sound absorption panel system according to claim 1, 2 or 3, wherein said active sound absorption control system is a system for noise reduction of an aircraft engine and said sound absorption space is formed in the space between the inner and outer walls of the nacelle constituting the intake/exhaust duct of the engine.

5. The actively-controlled sound absorption panel system according to claim 1, 2 or 3, wherein said surface plate comprises said perforated plate, and multi-layer metallic wire mesh and/or multi-layer porous sound absorption material stuck onto said perforated plate.

6. The actively-controlled sound absorption panel system according to claim 1, 2 or 3, wherein the structural members and sound absorption materials of said sound absorption panel section are formed by a heat-resistant material and/or material for high pressure and high temperature use, so as to achieve duct liner of turbine noise and acoustically lined ejector of jet noise.

7. The actively-controlled sound absorption panel system according to claim 1, 2 or 3, wherein said movement-controlled reflective plate is of arbitrary shape such as a flat plate, semi-elliptical, semi-cylindrical, hemispherical, or corrugated, or a shape obtained by superimposition of these.

8. The actively-controlled sound absorption panel system according to claim 1, 2 or 3, wherein said signal processor outputs a control signal relating to mode and position of said movement-controlled reflective plate processed by a least mean square algorithm such that the difference of the overall sound pressure levels measured by the sensing sensor arranged immediately in front of the fan and by the error sensor arranged upstream thereof is a maximum.

9. The actively-controlled sound absorption panel system according to claim 8, wherein a data bank, in which is in advance compiled and stored information regarding the amount of sound absorption performance of said sound absorption panel section, using the mode and positional displacement of the movement-controlled reflective plate as parameters, is utilized in said least mean square algorithm processing.

10. The actively-controlled sound absorption panel system according to claim 1, 2 or 3, wherein drive of the three-dimensional movement and rotation of said movement-controlled reflective plate is performed by a motor drive mechanism, hydraulic or air-pressurized drive mechanism or wire-wheel drive mechanism.

* * * * *